United States Patent
Olekss et al.

(10) Patent No.: US 11,551,204 B2
(45) Date of Patent: Jan. 10, 2023

(54) LEADING-PARTY-INITIATED CRYPTOLOGIC COORDINATED SYMMETRIC CONDITIONAL KEY RELEASE

(71) Applicant: Accenture Global Solutions Limited, Dublin (IE)

(72) Inventors: Janis Olekss, Ragana (LV); Fraser Edwards, London (GB); Peter Jacobus Nicolaas de Rooij, London (GB)

(73) Assignee: Accenture Global Solutions Limited, Dublin (IE)

( * ) Notice: Subject to any disclaimer, the term of this patent is extended or adjusted under 35 U.S.C. 154(b) by 24 days.

(21) Appl. No.: 16/668,419

(22) Filed: Oct. 30, 2019

(65) Prior Publication Data

US 2021/0133739 A1 May 6, 2021

(30) Foreign Application Priority Data

Oct. 30, 2019 (SG) ............................ 10201910109R (51) Int. Cl.
*G06Q 20/38* (2012.01)
*G06Q 20/22* (2012.01)

(52) U.S. Cl.
CPC ..... *G06Q 20/38215* (2013.01); *G06Q 20/223* (2013.01); *G06Q 20/3829* (2013.01)

(58) Field of Classification Search
None
See application file for complete search history.

(56) References Cited

U.S. PATENT DOCUMENTS 5,892,900 A * 4/1999 Ginter .................... G06Q 20/12
726/26
8,316,237 B1 * 11/2012 Felsher ................. H04L 9/0825
713/171

(Continued)

FOREIGN PATENT DOCUMENTS

CN 109064169 A 12/2018
CN 109345714 A 2/2019

(Continued)

OTHER PUBLICATIONS

Kilinç et al. Efficiently making secure two party computation fair, Part of the Lecture Notes in Computer Science book series (LNCS, vol. 9603) (Year: 2014).*

(Continued)

*Primary Examiner* — Jacob C. Coppola
*Assistant Examiner* — Eduardo Castilho
(74) *Attorney, Agent, or Firm* — Crowell & Moring LLP (57) ABSTRACT

A system supports symmetric release of cryptologically-locked asset transactions. A leading exchange party and a reciprocal exchange party establish, at least in part, a peer challenge in a pre-exchange proposal. The reciprocal party uses the peer challenge to lock a cryptologically-locked asset transaction. The solution to the peer challenge corresponds to an exchange key controlled by the leading exchange party. After establishment of the cryptologically-locked asset transaction, the leading party may request that exchange logic initiate release of the cryptologically-locked asset transaction. In response to the request, the exchange logic may execute a symmetric release of the exchange key and/or signature to the reciprocal exchange party and cryptologically-locked asset transaction (such that the asset is transferred to the leading exchange party).

12 Claims, 5 Drawing Sheets

(56) References Cited

U.S. PATENT DOCUMENTS

| | | | |
|---|---|---|---|
| 9,288,208 B1* | 3/2016 | Roth | G06F 21/602 |
| 2017/0154331 A1 | 6/2017 | Voorhees | |
| 2018/0285840 A1 | 10/2018 | Hasan | |
| 2019/0080299 A1* | 3/2019 | Thom | G06Q 20/02 |
| 2019/0095631 A1* | 3/2019 | Roets | G06F 21/64 |
| 2019/0116038 A1* | 4/2019 | Sprague | G06Q 20/401 |
| 2019/0164137 A1* | 5/2019 | Vincent | G06Q 20/14 |
| 2019/0173854 A1* | 6/2019 | Beck | H04L 9/3239 |
| 2019/0236594 A1* | 8/2019 | Ehrlich-Quinn | G06Q 20/401 |
| 2019/0362392 A1* | 11/2019 | Kim | G06Q 30/0272 |
| 2019/0372765 A1* | 12/2019 | Tegeder | H04L 9/14 |
| 2020/0014528 A1* | 1/2020 | Nandakumar | G06N 20/00 |

FOREIGN PATENT DOCUMENTS

| | | |
|---|---|---|
| CN | 109685489 A | 4/2019 |
| CN | 110175912 A | 8/2019 |
| CN | 110245517 A | 9/2019 |
| WO | WO 2019/180590 A1 | 9/2019 |

OTHER PUBLICATIONS

Examination report No. 1 issued on Australian patent application No. 2019261672 dated Jul. 27, 2020, 5 pages.

Written Opinion of corresponding Singapore patent application No. 10201910262V dated Jan. 2, 2020, 9 pages.

Search Report of corresponding Singapore patent application No. 10201910262V, dated Jan. 2, 2020, 3 pages.

Written Opinion of corresponding Singapore patent application No. 10201910109R dated Dec. 30, 2019, 3 pages.

Search Report of corresponding Singapore patent application No. 10201910109R, dated Dec. 30, 2019, 10 pages.

Examination Report of corresponding Singapore patent application No. 10201910262V dated Jun. 12, 2020, 5 pages.

Notice of Eligibility of corresponding Singapore patent application No. 10201910262V, dated Jun. 23, 2020, 1 pages.

Examination Report of corresponding Singapore patent application No. 10201910109R dated Jun. 12, 2020, 5 pages.

Notice of Eligibility of corresponding Singapore patent application No. 10201910109R, dated Jun. 16, 2020, 1 pages.

Non-Final Office Action of U.S. Appl. No. 16/668,829 dated Feb. 14, 2020, 37 pages.

Examination Report No. 3 for Australia Application No. 2019261672, dated Jun. 16, 2021, 5 pages.

Tsang et al., "Combating spam and denial-of-service attacks with trusted puzzle solvers", International Conference on Information Security Practice and Experience, pp. 188-202, Springer, Berlin, Heidelberg, 2008.

Examination report No. 2 issued on Australian patent application No. 2019261672 dated Jan. 27, 2021, 5 pages.

\* cited by examiner

LEADING-PARTY-INITIATED CRYPTOLOGIC COORDINATED SYMMETRIC CONDITIONAL KEY RELEASE

CROSS REFERENCE TO RELATED APPLICATIONS

This application claims is related to U.S. patent application Ser. No. 16/668,829, filed 30 Oct. 2019, and titled Cryptologic Coordinated Symmetric Conditional Key Release, which is incorporated by reference in its entirety.

PRIORITY

This application claims priority to Singaporean Patent Application No. 10201910109R, filed 30 Oct. 2019, and titled Leading-Party-Initiated Cryptologic Coordinated Symmetric Conditional Key Release, which is incorporated by reference in its entirety.

TECHNICAL FIELD

This disclosure relates to key release operations that are conditional and coordinated.

BACKGROUND

Rapid advances in electronics and communication technologies, driven by immense customer demand, have resulted in newly emerging secure network transactions. Improvements in the hardware and software implementations of the underlying processing and privacy features for the transactions will increase the security, reliability, and speed of the implementations.

DETAILED DESCRIPTION

Exchange parties may determine to perform an asset exchange. The asset exchange may be facilitated through pre-selected exchange platform. For example, the exchange parties may lack commonality in asset types among their respective holdings or commonality in asset geography. Additionally or alternatively, the exchange parties may lack commonality in transaction networking, transaction relationships, and/or transaction infrastructure. Thus, a third party may provide a platform on which the exchange parties may provide assets in types and geographies and through relationships available to them and receive assets in the types and geographies that have value to them. In some examples, the exchange parties may lack mutual trust and accordingly may designate a neutral third party to facilitate finalization of the transaction without ceding control of the asset itself to the third party (e.g., the exchange platform). Rather, the party transferring (e.g., a reciprocal party) the asset may lock an asset transaction transferring an asset to a receiving party (e.g., a leading party). Then, the reciprocal exchange party may turn over control of the locked asset transaction (as opposed to control of the asset itself) to the exchange platform. The exchange platform may then finalize the transaction by meeting the conditions for release of the transaction which may be defined, at least in part, in a peer challenge as discussed below.

In some cases, the exchange parties may prefer to avoid placing assets in the control/custody of a third party even in scenarios where executing the transaction through a third party (e.g., due to asset commonality issues) may be expedient. For the example exchange, a reciprocal exchange party may setup the cryptologically-locked asset transaction such that the exchanged asset is addressed to the leading exchange party at the outset. Accordingly, the third party is not necessarily provided with the ability to redirect assets at any point in the transaction. Like an intermediate network transporting encapsulated VPN packets, the third party may either (when proper conditions are met) release the asset to the transaction addressee or decline to do so. In some cases, revocation of a transaction may occur without input by the third party (e.g., through time locks as discussed below). Hence, the exchange platform may not necessarily be give even the authority to redirect an asset to its sender (as opposed to the addressee). Rather, the trust placed in the exchange platform is to fully and fairly execute release of the locked asset transaction and to release the transaction and exchange key symmetrically. Accordingly, upon finalization by the exchange platform, the reciprocal party has knowledge of the exchange key and the leading party and control of the asset is transferred to the leading party. Further, in various embodiments, the operations of the exchange platform may be defined using executable code provisioned and/or audited by the exchange parties. In some cases, trustless auditing schemes may be used to implement the code on the exchange platform.

In some cases, various operations of the exchange may be performed in a distributed framework with a centralized authority coordinating actions between the distributed nodes performing the exchange. In some cases, various ones of the peer nodes may implement a distributed ledger technology (DLT) or blockchain operations forming a peer network. In some cases, a blockchain and/or distribution on a peer network may be used to release exchange keys/locked transactions when finalizing transactions.

In some cases, placing trust in interested parties in an exchange provides competing points of security failure. Coordinated, symmetric release of the exchange key and locked asset transaction provides a security improvement to the operation of electronic transaction systems. Accordingly, the techniques and architectures discussed herein provide improvement over existing solutions in the market.

When exchanging parties lack mutual trust, a trusted third intermediary may take control of the assets in the exchange. Without the third party, the first party to relinquish control of their asset risks being cheated by the exchange counterpart. Hence, the parties are left in a stalemate both being unwilling to be the first actor and unable to move forward with the transaction. Accordingly, the conventional wisdom is a solution in which each party relinquishes control to a mutually trusted third party that verifies that both parties have acted. The architectures and techniques discussed herein represent a departure from the conventional wisdom by instead retaining control and direction of the assets with the exchanging parties. Specifically, the reciprocal exchange party locks an asset transaction and sets conditions for release to the leading party. The third party is called to verify the locking, verify the satisfaction of conditions, and symmetrically finalize the exchange. However, contrary to conventional wisdom control/custody of the assets may not necessarily be given to the third party. Rather, the third party's control is circumscribed to include the locked asset transaction and not the asset itself.

Figure 1:
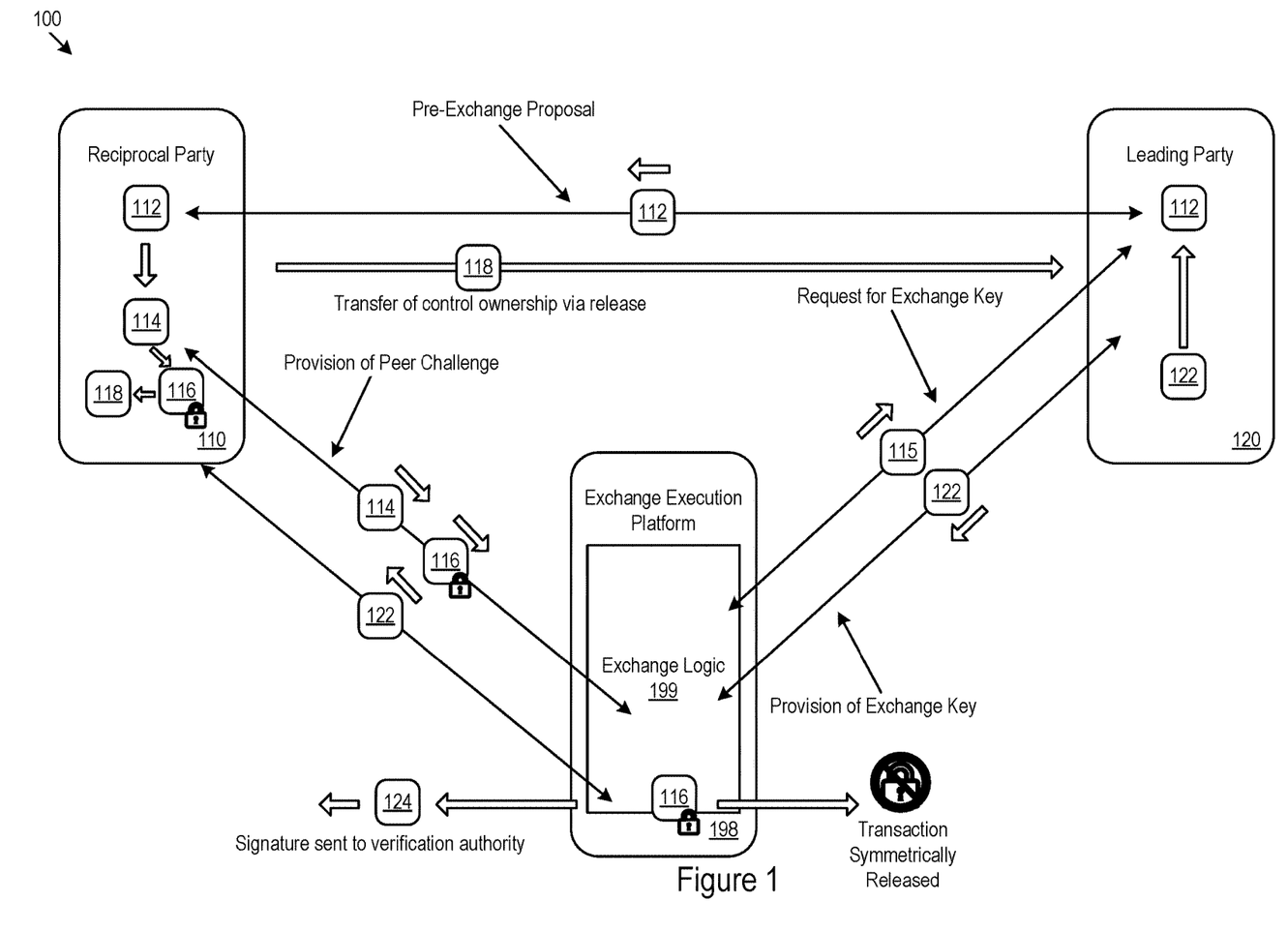
FIG. 1 shows an example exchange environment.

FIG. 1 shows an example exchange environment 100. In the example exchange environment 100, a reciprocal exchange party 110 may receive a challenge puzzle 112 from a leading exchange party 120 in a pre-exchange proposal. An exchange key 122 presumably controlled and/or known by the leading exchange party corresponds to the solution to the challenge puzzle 112. In various implementations, the challenge puzzle 112 may include a cryptologic puzzle. "Cryptologic" may be used to describe any technology or algorithm based on encryption, obfuscation, hashing, or other cipher-based system. The reciprocal party may, based on the challenge puzzle 112 generate a peer challenge 114 to which the exchange key 122 corresponds to a solution. The peer challenge 114 may, upon solution, complete one of the conditions for release of a cryptologically-locked asset transaction 116 that, upon release, transfers ownership/control of an asset 118 to an addressee, which may be the leading exchange party or associated with the leading exchange party 120. In some cases, an additional condition for release of the cryptologically-locked asset transaction may be a signature 124 of the cryptologically-locked asset transaction 116 by the exchange platform. The reciprocal peer challenge may be provided (e.g., by a reciprocal node associated with the reciprocal exchange party 110) such that exchange logic 199 operating on an exchange execution platform 198 as discussed below, may access the peer challenge 114.

In some cases, cryptologically-locked asset transactions 116 may be locked through schemes including hashed locks and hashed time-locks. However, other key-based asset locking schemes may be used. In some cases, such locking schemes may support timeout windows, which upon expiry, may revert an asset to the asset originator, in some cases this may be interpreted as the cryptologically-locked asset transaction 116 expiring without altering ownership of the asset. A timeout window may protect the asset originator from an asset loss incurred if an exchange does not go through to finalized execution. For example, this may prevent an asset from being permanently tied to a never-expiring cryptologically-locked asset transaction, thus robbing the asset originator of full use of the asset.

In various implementations the peer challenge 114 may be unambiguously and (in some cases) trivially derived from the challenge puzzle 112. For example, clear derivation from the challenge puzzle 112 may increase confidence and verifiability that the solution of the peer challenge 114 is the exchange key 122.

In various implementations, the reciprocal exchange party 110 may require a signature 124 (e.g., on the cryptologically-locked asset transaction 116 and/or accompanied by the released transaction) from the exchange platform as a condition of release of the cryptologically-locked asset transaction 116. Accordingly, the cryptologically-locked asset transaction 116 may be released when it is signed by the exchange platform and exchange key (e.g., the solution to the peer challenge 114) is sent to the reciprocal party 110.

Figure 2:
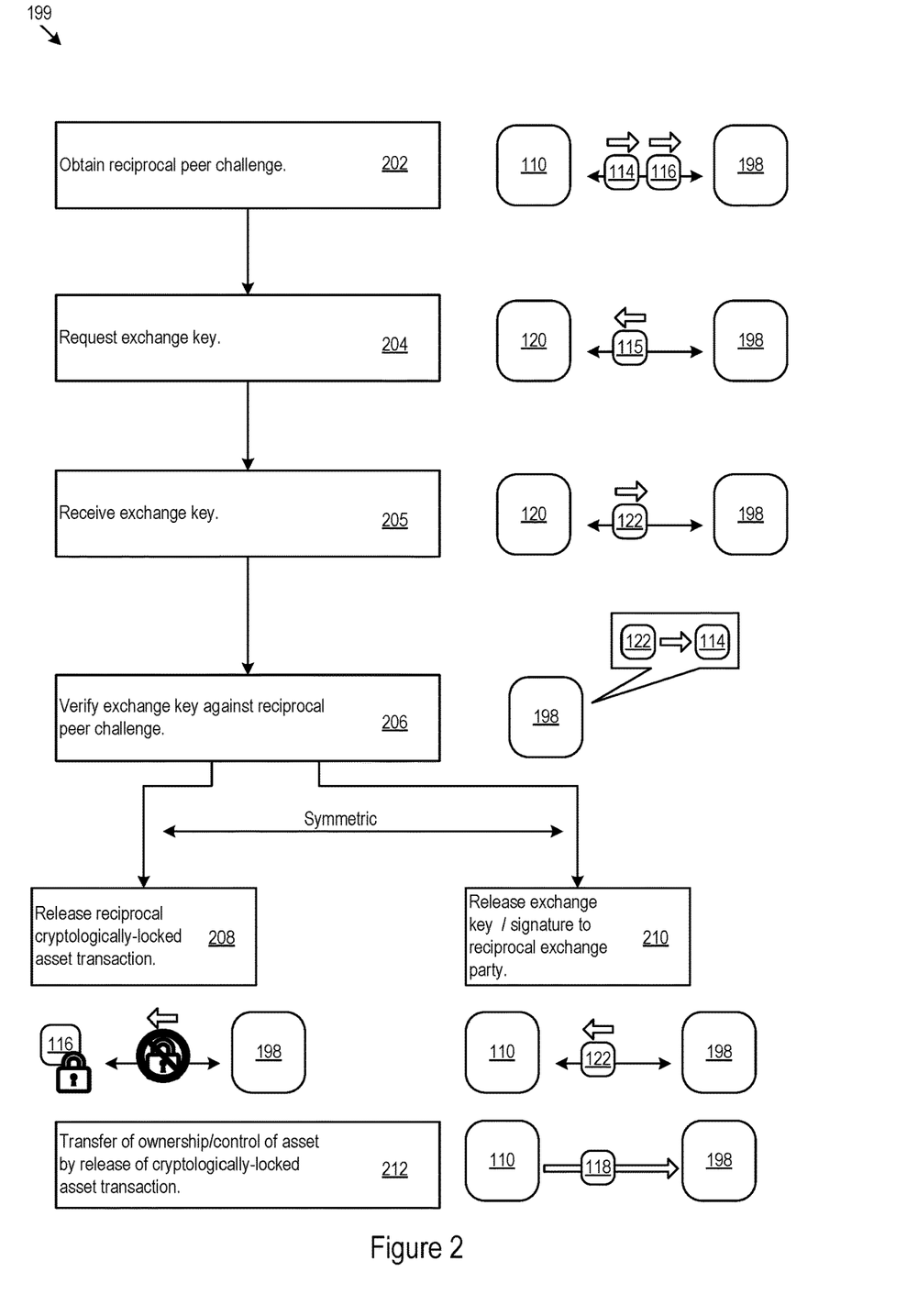
FIG. 2 shows example exchange logic.

Continuing to refer to FIG. 1 and now referring additionally to FIG. 2, FIG. 2 shows example exchange logic 199, which may be implemented on circuitry (e.g., exchange circuitry). The exchange logic 199, e.g., via network interface circuitry, may obtain the peer challenge 114 and the cryptologically-locked asset transaction 116 (202). As discussed above, the peer challenge 114 may have a solution corresponding to the exchange key 122 held by the leading party.

In various implementations, the exchange logic 199 may obtain the peer challenge 114 and the cryptologically-locked asset transaction 116 by receiving the peer challenge 114 and the cryptologically-locked asset transaction 116 over a communication link from a reciprocal node associated with the reciprocal exchange party; accessing the peer challenge 114 and the cryptologically-locked asset transaction 116 on a blockchain; receiving the peer challenge 114 and the cryptologically-locked asset transaction 116 from a peer node within a peer network; assessing the peer challenge 114 and the cryptologically-locked asset transaction 116 on a distributed ledger; accessing the peer challenge 114 and the cryptologically-locked asset transaction 116 on shared storage; or via other data communications/operations.

In an example scenario, the exchange logic 199 may execute within one or more peer nodes on a peer network hosting a distributed ledger. The reciprocal exchange party 110 may provide the peer challenge 114 to one or more peer nodes within the peer network, which may generate a record of the peer challenge 114 on the distributed ledger. Once recorded, the peer challenge 114 may be accessed by the peer nodes (e.g., with proper permissions in some cases). In some cases, the distributed ledger may be implemented on blockchain-based storage. In some implementations, the exchange logic may operate in a non-distributed and/or non-blockchain environment. For example, the exchange logic may operate on a centralized or centrally-controlled (but physically distributed) platform.

In some implementations, the peer challenge 114 may be digitally signed using a reciprocal private key associated with (e.g., under the control of) the reciprocal exchange party. For example, a digital signature may ensure ownership of the peer challenge 114 can be traced to the reciprocal exchange party 110. The reciprocal private key may be paired with a reciprocal public key that may be used to verify the authenticity of the digital signature.

The exchange logic 199 may obtain a request to release the reciprocal cryptologically-locked asset transaction. The request may include the exchange key 122. For example, the leading exchange party 120 may provide a request to release the reciprocal cryptologically-locked asset transaction using its control/knowledge of the exchange key 122. For example, the request to release the cryptologically-locked asset transaction 116 may be sent by the leading exchange party 120 in response to a notification from the reciprocal party that the cryptologically-locked asset transaction 116 was sent to the exchange logic 199.

In some implementations, the exchange logic 199 may send a request 115 for the exchange key to the leading party (204). For example, upon receiving the cryptologically-locked asset transaction 116, the exchange logic 199 may obtain an address for the leading exchange party, for example, by reading the address to which the asset is to be sent. The request 115 may include a reference to the peer challenge or portions (e.g., reproductions) of the code of the peer challenge itself. Further, the request may include a reference to the cryptologically-locked asset transaction 116 or portions (e.g., reproductions) of the code of the cryptologically-locked asset transaction 116 itself. Additionally or alternatively, the request 115 may include an identifier or reference to the asset 118 (e.g., rather than the cryptologically-locked asset transaction 116). Various implementations may support different request content—where the request content allows the leading exchange party 120 to identify the asset 118 being transferred and the exchange key 122 needed to release the transaction. The request 115 may further include security elements, such as signatures from the exchange execution platform 198 or reciprocal party 110, to help the leading exchange party determine the authenticity of the request 115.

Responsive to the request 115, the leading exchange party 120 may provide the exchange key 122 to the exchange logic (205). In some implementations, the leading exchange party 120 may sign the exchange key 122 upon provision to the exchange logic 199.

The exchange logic 199 may execute release of the cryptologically-locked asset transaction 116 once the exchange key 122 is received from the leading exchange party 120. The exchange logic 199 may verify the exchange key against the reciprocal peer challenge (206). For example, the exchange logic 199 may apply the exchange key 122 to the peer challenge 114 to verify that the exchange key 122 is a solution to the peer challenge 114.

Additionally or alternatively, the exchange logic 199 may request a digital signature using a private key controlled by and/or known to the leading exchange party. In some cases, the exchange key and/or request may be signed. In some cases, the exchange logic 199 may provide the cryptologically-locked asset transaction 116 to the leading exchange party for digital signature by the leading exchange party.

After verification, the exchange logic 199 may finalize execution of the response by facilitating release the cryptologically-locked asset transaction (e.g., transferring ownership/control of the asset 118 the leading exchange party). To facilitate release of the cryptologically-locked asset transaction 116, the exchange logic 199 (e.g., acting on behalf of the exchange platform) may apply a signature 124 to the cryptologically-locked asset transaction, and release the key to the reciprocal exchange party (210). With the conditions of the cryptologically-locked asset transaction 116 fulfilled, the exchange logic 199 may execute a symmetric release by, for example, releasing the exchange key 122 to the reciprocal party (210) at the same time as (or within a particular time window) the signature 124 applied to the cryptologically-locked asset transaction is sent to an verification authority (208). In some cases, the signed transaction may be published (e.g., on a distributed ledger) as a part of sending the transaction to the authentication party. Releasing the exchange key 122/signed 124 transaction include publicizing the exchange key 122/signature 124 and, as a result, entitling the leading exchange party to release of the cryptologically-locked asset transaction 116, publicizing the exchange key also operates to release/furnish the exchange key to the reciprocal exchange party (e.g., resulting in coordinate, symmetric release). In some cases, the authentication party may include a neutral third party other than the exchange platform, the reciprocal party, the leading partying, one or more peer nodes on a distributed network, or some combination thereof.

As an effect of the finalization (assuming successfully release of the locked asset transaction 116), ownership/control of the asset 118 is transferred to the leading party 120 through release of the cryptologically-locked asset transaction 116 (212). As discussed above, the exchange logic 199 may lack the authority to control the results of releasing the cryptologically-locked asset transaction 116. Rather, the exchange logic 199 may either facilitate the completion of the conditions for release of the cryptologically-locked asset transaction 116 or fail/decline to do so.

Additionally or alternatively, a signature of the leading party may be a condition of the cryptologically-locked asset transaction 116. The requirement of signature by the leading party 116 may ensure that the leading party has the opportunity to verify and is appraised of all conditions and addresses used in the cryptologically-locked asset transaction 116 before providing the exchange key 122. The may help to ensure that the leading party 120 is unable to later claim non-knowledge of an incorrect address or other inappropriate condition of transfer and imply the that reciprocal party 110 obtained the exchange key through deception or is responsible for a misdirected asset transfer.

The release of the exchange key may be effected by: publishing the exchange key 122/signature 124 on a distributed ledger (e.g., where a distributed ledger is implemented); storing the exchange key 122/signature 124 in a decrypted form; distributing the exchange key 122/signature 124 over a peer network (e.g., using the peer nodes on a peer network to publicize the exchange key 122/signature 124 to ensure eventual access by the reciprocal exchange party); encrypting the exchange key 122/signature 124 using a public key associated with the reciprocal exchange party or other agreed-to cryptologic key (e.g., as discussed above); addressing the exchange key 122/signature 124 to the reciprocal exchange party (e.g., the exchange key 122/signature 124 may be unicast using one of various communication operations at a reciprocal node associated with the reciprocal exchange party); sending the exchange key 122/signature 124 to a reciprocal node over a communication link (e.g., a directed communication link such as a tunnel or other link); or other scheme for delivery of the exchange key 122/signature 124 into the possession of reciprocal exchange party (or in some cases another authentication party).

In various implementations, the cryptologically-locked asset transaction 116 may establish a timeout window. After the timeout window expires, the cryptologically-locked asset transaction 116 may cause the assets to revert to their pre-exchange states (e.g., control by the originating parties). Accordingly, as discussed above, the exchange execution platform 198 for execution of the exchange) may either execute the exchange and cause the symmetric release of the exchange key and the transaction 116 or decline to execute the transaction. Because the timeout window may self-execute the reversion to pre-exchange states, the control executed by the exchange logic 199 may be circumscribed by the reciprocal party. For example, the exchange logic may act as a gate for determining to proceed with cryptologically-locked asset transaction 116, but may not necessarily have similar gate status with regard to reversion.

Figure 5:
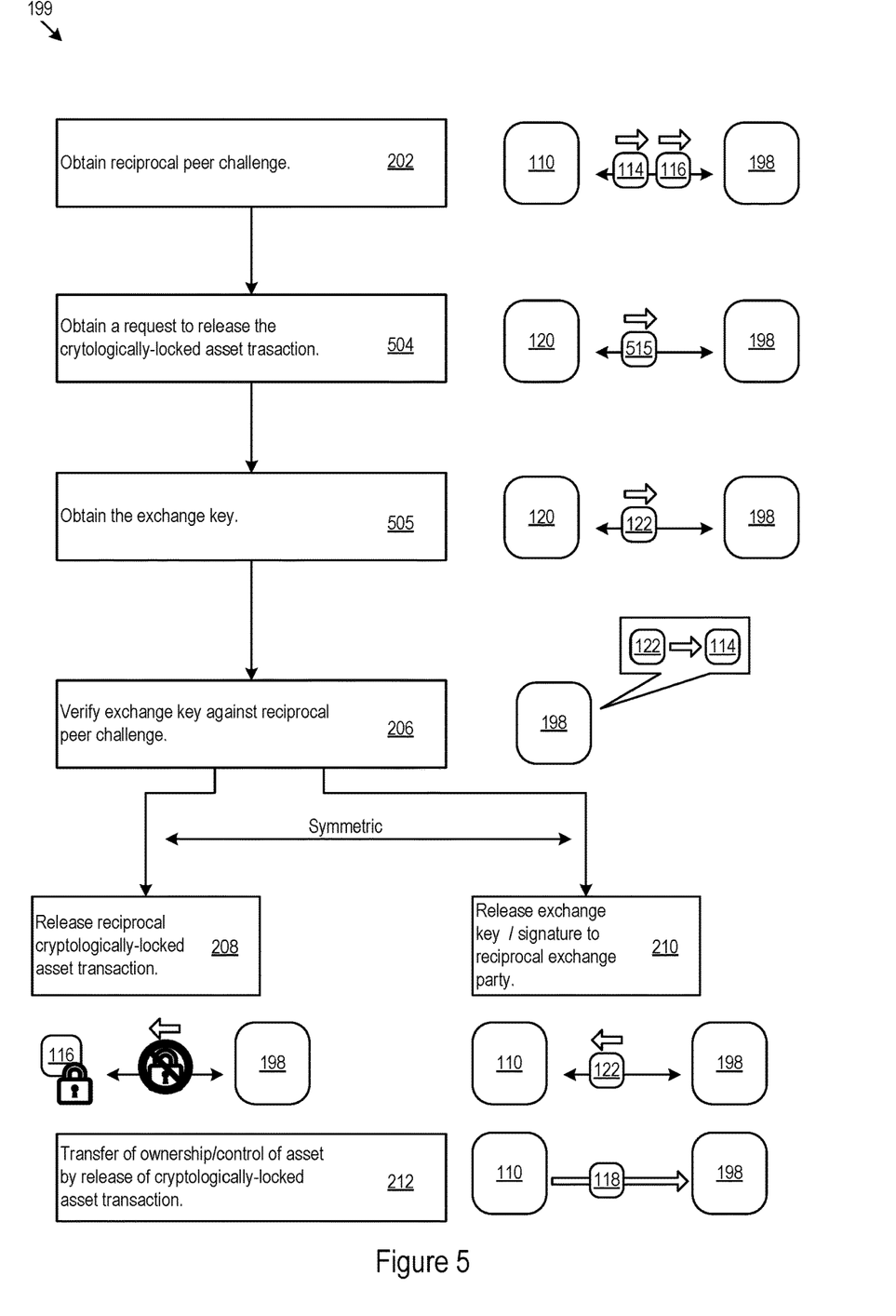
FIG. 5 shows example exchange logic.

FIG. 5 shows example exchange logic 199. In the example shown in FIG. 5, the exchange logic 199 may obtain a request 515 to release the cryptologically-locked asset transaction (504). For example, the exchange logic 199 may receive the request 515 in a communication from the leading exchange party 120. In some cases, the request may include the exchange key 122. For example, the leading exchange party 120 may provide a request to release the reciprocal cryptologically-locked asset transaction using its control/knowledge of the exchange key 122. For example, the request to release the cryptologically-locked asset transaction 116 may be sent by the leading exchange party 120 in response to a notification from the reciprocal party that the cryptologically-locked asset transaction 116 was sent to the exchange logic 199. Additionally or alternatively, the leading party rely on information obtain in the pre-exchange proposal.

In response to the request 515 to release the cryptologically-locked asset transaction, the exchange logic 199 may obtain the exchange key 122. In some cases, the request 515 may include the exchange key 122. Accordingly, the exchange logic 199 may extract the exchange key 122 from the request 515. In some cases, the request may include a reference or pointer to a location of exchange key 122. In some cases, the request 515 may include instructions regard how the exchange key 122 may be obtained. In some cases, the exchange logic 199 may respond to the request 515 with a request 115 for the exchange key 122 from the leading exchange party 120.

Figure 3:
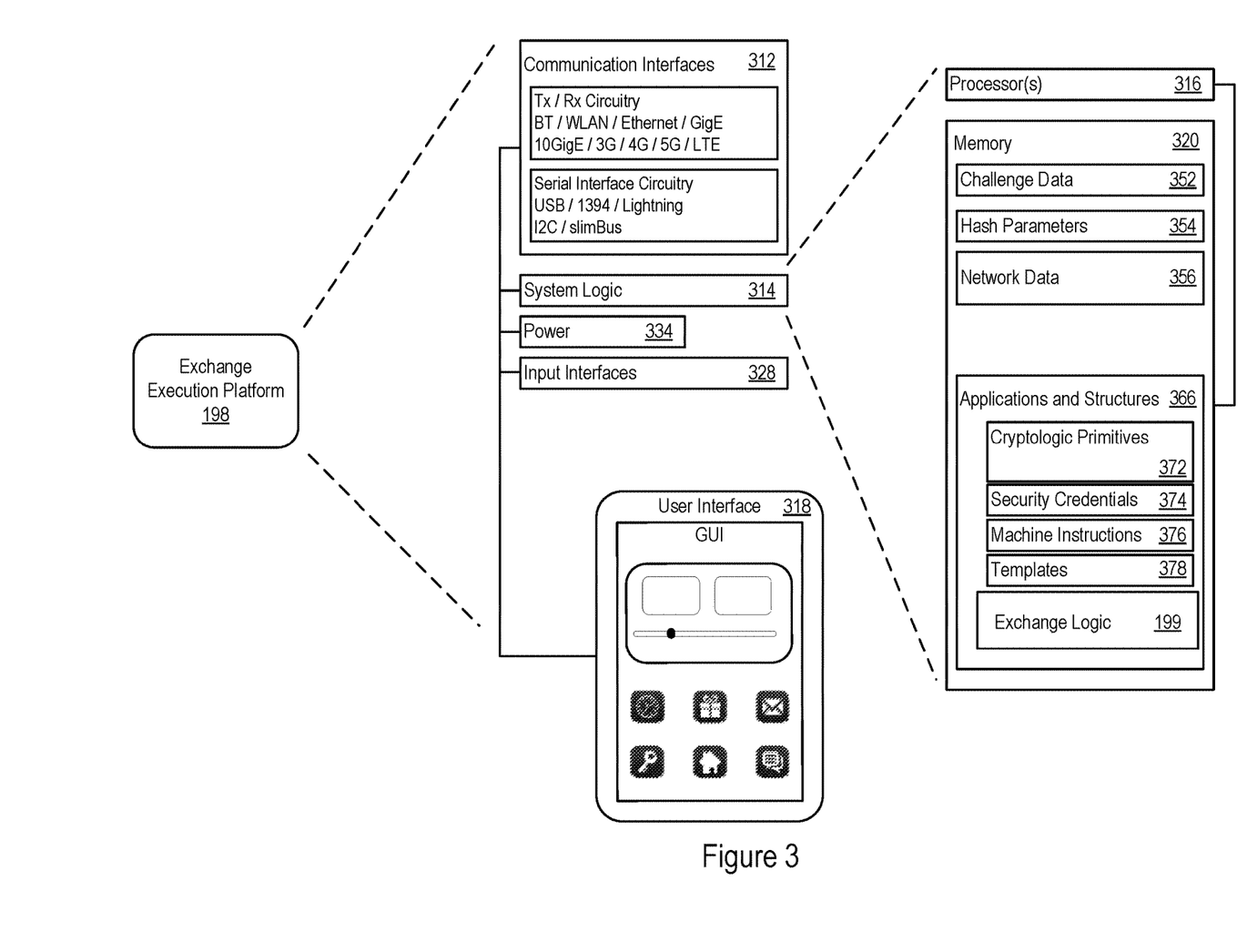
FIG. 3 shows an example exchange execution platform.

FIG. 3 shows an example exchange execution platform 198. The example exchange execution platform 198 may include system logic 314 to support execution of the exchange logic 199 described above. The system logic 314 may include processors 316, memory 320, and/or other circuitry. In various implementations, the example exchange execution platform 198 may act as (and/or incorporate) the exchange circuitry when specifically configured to implement exchange logic 199.

The memory 320 may include challenge data 352, hash parameters 354, and network data 356 to facilitate exchanges and symmetric release. The memory 320 may further include applications and structures 366, for example, cryptologic primitives 372, security credentials 374, machine instructions 376, templates 378, or other structures to peer network operations, exchange key release, asset release, exchange key verification, distributed ledger access, blockchain access, peer network interactions, request generation, authorization document capture, and/or other tasks described above. The applications and structures may implement the exchange logic 199.

The example exchange execution platform 198 may also include communication interfaces 312, which may support wireless, e.g. Bluetooth, Wi-Fi, WLAN, cellular (4G, LTE/A), and/or wired, Ethernet, Gigabit Ethernet, optical networking protocols. The communication interfaces 312 may also include serial interfaces, such as universal serial bus (USB), serial ATA, IEEE 1394, lighting port, $I^2C$, slimBus, or other serial interfaces. The communication interfaces 312 may be used as network interface circuitry to support and/or implement peer network interactions, remote operation, peer network participation, blockchain access, request transfer, or other tasks. The example exchange execution platform 198 may include power functions 334 and various input interfaces 328. The example exchange execution platform 198 may also include a user interface 318 that may include human-to-machine interface devices and/or graphical user interfaces (GUI). The user interface 318 may be used to support and/or implement local or localized operation (noting that the example exchange execution platform 198 itself may be distributed) of the example exchange execution platform 198. In various implementations, the example exchange execution platform 198 implemented as the exchange circuitry and may be distributed over one or more physical servers, be implemented as one or more virtual machines, be implemented in container environments such as Cloud Foundry or Docker, and/or be implemented in Serverless (functions as-a-Service) environments.

In some cases, the example exchange execution platform 198 may be a specially defined computational system deployed in a cloud platform, with a localized control terminal. In some cases, the parameters defining the execution environment may be specified in a manifest for cloud deployment. The manifest may be used by an operator to requisition cloud based hardware resources, and then deploy the software components, for example, the applications and structures 366, of the example exchange execution platform 198 onto the hardware resources. In some cases, a manifest may be stored as a preference file such as a YAML (yet another mark-up language), JSON, or other preference file type.

Figure 4:
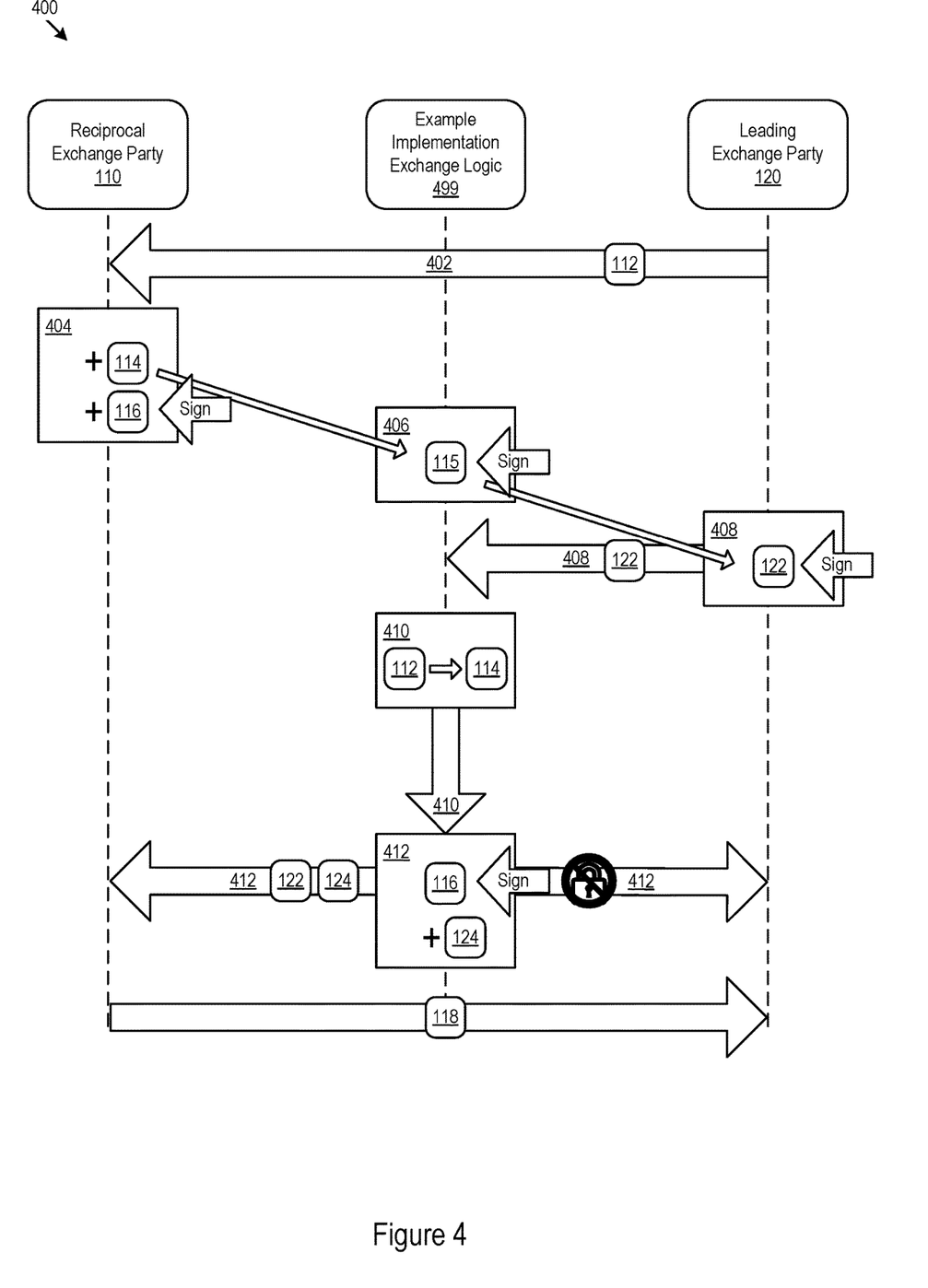
FIG. 4 shows an example illustrative execution scenario for example implementation exchange logic.

FIG. 4 shows an example illustrative execution scenario 400 for example implementation exchange logic 499. In a pre-exchange proposal (402), reciprocal 110 and leading 120 exchange parties agree to exchange an asset 118 and the leading exchange party 120 may send a challenge puzzle 112 to the reciprocal exchange party 110.

During reciprocal establishment (404), the reciprocal exchange party 110 may lock an asset transaction 116 using a peer challenge 114 based on the challenge puzzle 112, address the cryptologically-locked asset transaction, such that the asset 118 is transferred to the leading exchange party 120 upon release of the cryptologically-locked asset transaction 116. The reciprocal party may digitally sign the cryptologically-locked asset transaction 116.

During request establishment (406), the example implementation exchange logic 499 may obtain the peer challenge 114 and the cryptologically-locked asset transaction 116. The example implementation exchange logic 499 may identify the leading party, for example, by reading the target address of the locked asset transaction. The exchange platform may send a request for the exchange key to the leading exchange party 120. The request 115 for the exchange key may include at least a reference to each of the peer challenge 114 and the cryptologically-locked asset transaction 116. In some cases, example implementation exchange logic 499 may sign the request 115.

Additionally or alternatively, the leading party 120 may send a request to the exchange platform to initiate finalization of the cryptologically-locked asset transaction 116. For example, in some cases, initiation by the leading party 120 may occur in place of the request from the example implementation exchange logic 499. In the example, the leading party 120 may send a communication to the exchange platform based on information obtained (e.g., such as the identity of the exchange platform) from the pre-exchange proposal. In some cases, the communication from the leading party 120 initiating the exchange may include the exchange key.

During key provision (408), the leading exchange party 120 may send the exchange key to the example implementation exchange logic 499. The leading exchange party may sign the exchange key 122 prior to provision to the example implementation exchange logic 499. The leading exchange party 120 and the example implementation exchange logic 499 may take steps (e.g., encrypting the key transfer or otherwise obfuscating the transfer) to ensure the exchange key 122 remains private and is not exposed prior to symmetric release of the cryptologically-locked asset transaction 116.

During verification (410), the example implementation exchange logic 499 apply the exchange key 122 to the peer challenge 114 to verify that the exchange key 122 is a solution to the peer challenge 114. Further, in some cases, the leading party 120 may review the cryptologically-locked asset transaction 116 to ensure that the cryptologically-locked asset transaction 116 is configured to release the same asset 118 that was agreed to in the pre-exchange proposal During finalization (412), if the exchange key 122 corresponds to a solution to the peer challenge 114 and any compulsory signatures are provided by the reciprocal 110 and/or leading 120 parties, the example implementation exchange logic 499 may sign the cryptologically-locked asset transaction 116 to provide the final condition for release of the transaction 116. The release of the cryptologically-locked asset transaction (e.g., provision of the signature 124 and provision of the exchange key to the reciprocal exchange party 110) may be executed symmetrically. In some cases, neither exchange party is provided knowledge/ status associated with the released transaction until both parties have (or at least have access to) such corresponding knowledge/status. In some cases, symmetric execution may include provision of knowledge/status to the parties within time windows setup by the peer challenges or other time period calculated to ensure the interests of the parties are equally (e.g., symmetrically) protected.

The methods, devices, processing, circuitry, and logic described above and in the specific illustrative examples below may be implemented in many different ways and in many different combinations of hardware and software. For example, all or parts of the implementations may be circuitry that includes an instruction processor, such as a Central Processing Unit (CPU), microcontroller, or a microprocessor; or as an Application Specific Integrated Circuit (ASIC), Programmable Logic Device (PLD), or Field Programmable Gate Array (FPGA); or as circuitry that includes discrete logic or other circuit components, including analog circuit components, digital circuit components or both; or any combination thereof. The circuitry may include discrete interconnected hardware components or may be combined on a single integrated circuit die, distributed among multiple integrated circuit dies, or implemented in a Multiple Chip Module (MCM) of multiple integrated circuit dies in a common package, as examples.

Accordingly, the circuitry may store or access instructions for execution, in hardware, or may implement its functionality in hardware alone. The instructions may be stored in a tangible storage medium that is other than a transitory signal, such as a flash memory, a Random Access Memory (RAM), a Read Only Memory (ROM), an Erasable Programmable Read Only Memory (EPROM); or on a magnetic or optical disc, such as a Compact Disc Read Only Memory (CDROM), Hard Disk Drive (HDD), or other magnetic or optical disk; or in or on another machine-readable medium. A product, such as a computer program product, may include a storage medium and instructions stored in or on the medium, and the instructions when executed by the circuitry in a device may cause the device to implement any of the processing described above or illustrated in the drawings.

The implementations may be distributed. For instance, the circuitry may include multiple distinct system components, such as multiple processors and memories, and may span multiple distributed processing systems. Parameters, databases, and other data structures may be separately stored and managed, may be incorporated into a single memory or database, may be logically and physically organized in many different ways, and may be implemented in many different ways. Example implementations include linked lists, program variables, hash tables, arrays, records (e.g., database records), objects, and implicit storage mechanisms. Instructions may form parts (e.g., subroutines or other code sections) of a single program, may form multiple separate programs, may be distributed across multiple memories and processors, and may be implemented in many different ways. Example implementations include stand-alone programs, and as part of a library, such as a shared library like a Dynamic Link Library (DLL). The library, for example, may contain shared data and one or more shared programs that include instructions that perform any of the processing described above or illustrated in the drawings, when executed by the circuitry.

Various implementations may use the techniques and architectures described above.

A1 In an example, a system includes: network interface circuitry configured to: obtain a peer challenge: the peer challenge established, at least in part, in a pre-exchange proposal between a reciprocal exchange party and a leading exchange party; the peer challenge configured to designate an exchange execution platform for a cryptologically-locked asset transaction, the exchange execution platform selected during the pre-exchange proposal, the cryptologically-locked asset transaction configured to, when released, transfer an asset to the leading exchange party; the peer challenge configured to release the cryptologically-locked asset transaction, after: an exchange key is provided by leading exchange party, and the cryptologically-locked asset transaction is signed by the exchange execution platform; and obtain the exchange key to facilitate release of the cryptologically-locked asset transaction, the exchange key originating from the leading exchange party; and exchange circuitry in data communication with the network interface circuitry and operating on behalf of the exchange execution platform, the exchange circuitry configured to: execute the release of the cryptologically-locked transaction asset by: generating a request for the exchange key from the exchange party; verifying the exchange key against the peer challenge; and after verification of the exchange key, finalizing by: facilitating release of the cryptologically-locked asset transaction by signing the cryptologically-locked asset transaction; and at a time of authorizing release of the cryptologically-locked asset transaction, releasing the exchange key to the reciprocal exchange party.

A2 The system of example A1, where: the cryptologically-locked asset transaction configured to, upon expiry without release, return an asset to a sender instead of transferring the asset to the leading exchange party; the cryptologically-locked asset transaction is configured to establish a timeout window; and after expiry of the timeout window, the cryptologically-locked asset transaction is configured to expire without release.

A3 The system of example A1 or A2, where the pre-exchange proposal includes: transfer of a cryptologic puzzle from the leading exchange party to the reciprocal exchange party while withholding the exchange key, the exchange key corresponding to a solution of the cryptologic puzzle.

A4 The system of any of examples A1-A3, where a reciprocal node, on behalf of the reciprocal exchange party, is configured to generate the peer challenge based on the cryptologic puzzle.

A5 The system of any of examples A1-A4, where the exchange circuitry is configured to release the exchange key to the reciprocal exchange party by: publishing the exchange key on a distributed ledger; storing the exchange key in a decrypted form; distributing the exchange key over a peer network; encrypting the exchange key using a public key associated with the reciprocal exchange party; addressing the exchange key to the reciprocal exchange party; sending, via the network interface circuitry, the exchange key to a reciprocal node over a communication link, the reciprocal node associated with the reciprocal exchange party; or any combination of the foregoing.

A6 The system of any of examples A1-A5, where the network interface circuitry is configured to obtain the peer challenge by: receiving the peer challenge over a communication link from a reciprocal node associated with the reciprocal exchange party; accessing the peer challenge on a distributed ledger; receiving the peer challenge from a peer node within a peer network; or any combination of the foregoing.

A7 The system of any of examples A1-A6, where the cryptologically-locked asset transaction is digitally signed using a reciprocal private key associated with the reciprocal exchange party.

A8 The system of any of examples A1-A7, where exchange circuitry is configured to verify the exchange key against the peer challenge by: sending the cryptologically-locked asset transaction to the leading exchange party; and after sending the cryptologically-locked asset transaction, obtaining the cryptologically-locked asset transaction digitally signed using a leading private key associated with the leading exchange party.

A9 The system of any of examples A1-A8, where the peer challenge includes a hash.

A10 The system of any of examples A1-A9, where the request for the exchange key includes: a reference to the peer challenge; a reference to the cryptologically-locked asset transaction; the peer challenge; the cryptologically-locked asset transaction; or any combination of the foregoing.

B1 In an example, a method includes: at network interface circuitry: obtaining a peer challenge: the peer challenge established, at least in part, in a pre-exchange proposal between a reciprocal exchange party and a leading exchange party; the peer challenge configured to designate an exchange execution platform for a cryptologically-locked asset transaction, the exchange execution platform selected during the pre-exchange proposal, the cryptologically-locked asset transaction configured to, when released, transfer an asset to the leading exchange party; the peer challenge configured to release the cryptologically-locked asset transaction, after: an exchange key is provided by leading exchange party, and the cryptologically-locked asset transaction is signed by the exchange execution platform; and obtaining the exchange key to facilitate release of the cryptologically-locked asset transaction, the exchange key originating from the leading exchange party; and at exchange circuitry in data communication with the network interface circuitry and operating on behalf of the exchange execution platform: executing the release of the cryptologically-locked transaction asset by: generating a request for the exchange key from the exchange party; verifying the exchange key against the peer challenge; and after verification of the exchange key, finalizing by: facilitating release of the cryptologically-locked asset transaction by signing the cryptologically-locked asset transaction; and at a time of authorizing release of the cryptologically-locked asset transaction, releasing the exchange key to the reciprocal exchange party.

B2 The method of example B1, where releasing the exchange key to the reciprocal exchange party includes: publishing the exchange key on a distributed ledger; storing the exchange key in a decrypted form; distributing the exchange key over a peer network; encrypting the exchange key using a public key associated with the reciprocal exchange party; addressing the exchange key to the reciprocal exchange party; sending, via the network interface circuitry, the exchange key to a reciprocal node over a communication link, the reciprocal node associated with the reciprocal exchange party; or any combination of the foregoing.

B3 The method of example B1 or B2, where obtaining the peer challenge includes: receiving the peer challenge over a communication link from a reciprocal node associated with the reciprocal exchange party; accessing the peer challenge on a distributed ledger; receiving the peer challenge from a peer node within a peer network; or any combination of the foregoing.

B4 The method of any examples B1-B3, where the cryptologically-locked asset transaction is digitally signed using a reciprocal private key associated with the reciprocal exchange party.

B5 The method of any examples B1-B4, where verifying the exchange key against the peer challenge includes: sending the cryptologically-locked asset transaction to the leading exchange party; and after sending the cryptologically-locked asset transaction, obtaining the cryptologically-locked asset transaction digitally signed using a leading private key associated with the leading exchange party.

B6 The method of any examples B1-B5, where the peer challenge includes a hashed time lock.

B7 The method of any examples B1-B6, where the request for the exchange key includes: a reference to the peer challenge; a reference to the cryptologically-locked asset transaction; the peer challenge; the cryptologically-locked asset transaction; or any combination of the foregoing.

C1 In an example, a product includes: machine-readable media other than a transitory signal; and instructions stored on the machine-readable media, the instructions configured to, when executed, cause a machine to: at network interface circuitry: obtain a peer challenge: the peer challenge established, at least in part, in a pre-exchange proposal between a reciprocal exchange party and a leading exchange party; the peer challenge configured to designate an exchange execution platform for a cryptologically-locked asset transaction, the exchange execution platform selected during the pre-exchange proposal, the cryptologically-locked asset transaction configured to, when released, transfer an asset to the leading exchange party; the peer challenge configured to release the cryptologically-locked asset transaction, after: an exchange key is provided by leading exchange party, and the cryptologically-locked asset transaction is signed by the exchange execution platform; and obtain the exchange key to facilitate release of the cryptologically-locked asset transaction, the exchange key originating from the leading exchange party; and at exchange circuitry in data communication with the network interface circuitry and operating on behalf of the exchange execution platform: execute the release of the cryptologically-locked transaction asset by: generating a request for the exchange key from the exchange party; verifying the exchange key against the peer challenge; and after verification of the exchange key, finalizing by: facilitating release of the cryptologically-locked asset transaction by signing the cryptologically-locked asset transaction; and at a time of authorizing release of the cryptologically-locked asset transaction, releasing the exchange key to the reciprocal exchange party.

C2 The product of example C1, where the pre-exchange proposal includes: transfer of a cryptologic puzzle from the leading exchange party to the reciprocal exchange party while withholding the exchange key, the exchange key corresponding to a solution of the cryptologic puzzle.

The product of example C1 or C2, where a reciprocal node, on behalf of the reciprocal exchange party, is configured to generate the peer challenge based on the cryptologic puzzle.

D1 In an example, a system includes: network interface circuitry configured to: obtain a peer challenge: the peer challenge established, at least in part, in a pre-exchange proposal between a reciprocal exchange party and a leading exchange party; the peer challenge configured to designate an exchange execution platform for a cryptologically-locked asset transaction, the exchange execution platform selected during the pre-exchange proposal, the cryptologically-locked asset transaction configured to, when released, transfer an asset to the leading exchange party; the peer challenge configured to release the cryptologically-locked asset transaction, after: an exchange key is provided on behalf of the leading exchange party, and the cryptologically-locked asset transaction is signed by the exchange execution platform; and obtain a request to release the cryptologically-locked asset transaction, the request originating from the leading exchange party; and exchange circuitry in data communication with the network interface circuitry and operating on behalf of the exchange execution platform, the exchange circuitry configured to: execute the release of the cryptologically-locked transaction asset by: based on the request, obtaining the exchange key; verifying the exchange key against the peer challenge; and after verification of the exchange key, finalizing by: facilitating release of the cryptologically-locked asset transaction by signing the cryptologically-locked asset transaction; and symmetrically, along with authorizing release of the cryptologically-locked asset transaction, releasing the exchange key to the reciprocal exchange party.

D2 The system of example D1, where: the request includes the exchange key; and the exchange circuitry is configured to obtain the exchange key by extracting the exchange key from the request.

D3 The system of either of examples D1 or D2, where the pre-exchange proposal further identifies the exchange execution platform.

D4 The system of any of examples D1-D3, where the request is addressed to the exchange execution platform.

D5 The system of any of examples D1-D4, where the network interface circuitry is configured to obtain the request by: accessing the request on a distributed ledger; decrypting the request using a private key associated with an identity controlled by the exchange execution platform; receiving the request from a peer node within a peer network; or any combination of the foregoing.

D6 The system of any of examples D1-D5, where the request is signed using a private key associated with an identity controlled by the leading exchange party.

D7 The system of any of examples D1-D6, where the network interface circuitry is configured to obtain the request after a leading node associated with the leading exchange party performs an inspection of the cryptologically-locked asset transaction.

D8 The system of any of examples D1-D7, where the inspection includes a determination that the asset includes an asset defined in the pre-exchange proposal.

D9 The system of example D1, where the request does not include the exchange key.

D10 The system of any of examples D1-D9, where the exchange circuitry is configured to obtain the exchange key by: sending a communication to the leading exchange party in response to request; accessing the exchange key based on a reference within the request; receiving a message including the exchange key, the message sent on behalf of the leading exchange party, the message separate from the request; or any combination of the foregoing.

E1 In an example, a method includes: at network interface circuitry:
obtaining a peer challenge: the peer challenge established, at least in part, in a pre-exchange proposal between a reciprocal exchange party and a leading exchange party; the peer challenge configured to designate an exchange execution platform for a cryptologically-locked asset transaction, the exchange execution platform selected during the pre-exchange proposal, the cryptologically-locked asset transaction configured to, when released, transfer an asset to the leading exchange party; the peer challenge configured to release the cryptologically-locked asset transaction, after: an exchange key is provided on behalf of the leading exchange party, and the cryptologically-locked asset transaction is signed by the exchange execution platform; and obtaining a request to release the cryptologically-locked asset transaction, the request originating from the leading exchange party; and at exchange circuitry in data communication with the network interface circuitry and operating on behalf of the exchange execution platform: executing the release of the cryptologically-locked transaction asset by: based on the request, obtaining the exchange key; verifying the exchange key against the peer challenge; and after verification of the exchange key, finalizing by: facilitating release of the cryptologically-locked asset transaction by signing the cryptologically-locked asset transaction; and symmetrically, along with authorizing release of the cryptologically-locked asset transaction, releasing the exchange key to the reciprocal exchange party.

E2 The method of example E1, where: the request includes the exchange key; and where obtaining the exchange key includes extracting the exchange key from the request.

E3 The method of either of examples E1 or E2, where the pre-exchange proposal further identifies the exchange execution platform.

E4 The method of any of examples E1-E3, where the request is addressed to the exchange execution platform.

E5 The method of any of examples E1-E4, where obtaining the request includes: accessing the request on a distributed ledger; decrypting the request using a private key associated with an identity controlled by the exchange execution platform; receiving the request from a peer node within a peer network; or any combination of the foregoing.

E6 The method of any of examples E1-E5, where the request is signed using a private key associated with an identity controlled by the leading exchange party.

E7 The method of any of examples E1-E6, where the network interface circuitry is configured to obtain the request after a leading node associated with the leading exchange party performs an inspection of the cryptologically-locked asset transaction.

E8 The method of any of examples E1-E7, where the inspection includes a determination that the asset includes an asset defined in the pre-exchange proposal.

F1 In an example, a product includes: machine-readable media other than a transitory signal; and instructions stored on the machine-readable media, the instructions configured to, when executed, cause a machine to: at network interface circuitry: obtain a peer challenge: the peer challenge established, at least in part, in a pre-exchange proposal between a reciprocal exchange party and a leading exchange party; the peer challenge configured to designate an exchange execution platform for a cryptologically-locked asset transaction, the exchange execution platform selected during the pre-exchange proposal, the cryptologically-locked asset transaction configured to, when released, transfer an asset to the leading exchange party; the peer challenge configured to release the cryptologically-locked asset transaction, after: an exchange key is provided on behalf of the leading exchange party, and the cryptologically-locked asset transaction is signed by the exchange execution platform; and obtain a request to release the cryptologically-locked asset transaction, the request originating from the leading exchange party; and at exchange circuitry in data communication with the network interface circuitry and operating on behalf of the exchange execution platform: execute the release of the cryptologically-locked transaction asset by: based on the request, obtaining the exchange key; verifying the exchange key against the peer challenge; and after verification of the exchange key, finalizing by: facilitating release of the cryptologically-locked asset transaction by signing the cryptologically-locked asset transaction; and symmetrically, along with authorizing release of the cryptologically-locked asset transaction, releasing the exchange key to the reciprocal exchange party.

F2 The product of example F1, where: the cryptologically-locked asset transaction configured to, upon expiry without release, return an asset to a sender instead of transferring the asset to the leading exchange party; the cryptologically-locked asset transaction is configured to establish a timeout window; and after expiry of the timeout window, the cryptologically-locked asset transaction is configured to expire without release.

G1 A method implemented by operation of a system of any of examples A1-A10 and D1-D10.

H1 A product including instructions stored on a machine-readable medium, the instructions configured to cause a machine to implement the method of example G1.

Various implementations have been specifically described. However, many other implementations are also possible.

What is claimed is:

1. A system including:
an exchange execution platform including:
a network interface circuitry configured to:
obtain a peer challenge from a reciprocal exchange party, wherein
the peer challenge is configured to identify the exchange execution platform for a cryptologically-locked asset transaction, the cryptologically-locked asset transaction configured, when released, to transfer an asset to a leading exchange party from the reciprocal exchange party;
the peer challenge configured to release the cryptologically-locked asset transaction, after:
an exchange key is provided on behalf of the leading exchange party, and
the cryptologically-locked asset transaction is signed;
obtain the cryptologically-locked asset transaction from the reciprocal exchange party; and
obtain a request from the leading exchange party to release the cryptologically-locked asset transaction, wherein
the request is addressed to the exchange execution platform; and
an exchange circuitry in data communication with the network interface circuitry and operating on behalf of the exchange execution platform, the exchange circuitry including a processor and a memory storing instructions executable by the processor to cause the exchange circuitry to:
obtain the request from the network interface circuitry;
execute the release of the cryptologically-locked asset transaction by:
extracting the exchange key horn from the request;
verifying the exchange key against the peer challenge; and
after verification of the exchange key, releasing the cryptologically-locked asset transaction by symmetrically coordinating both:
signing the cryptologically-locked asset transaction; and
releasing the exchange key to the reciprocal exchange party.

2. The system of claim 1, where:
the request includes the exchange key; and
the exchange circuitry is configured to obtain the exchange key by extracting the exchange key from the request.

3. The system of claim 1, where the request is signed using a private key associated with an identity controlled by the leading exchange party.

4. The system of claim 1, where the network interface circuitry is configured to obtain the request from a leading node associated with the leading exchange party.

5. The system of claim 1, where the request does not include the exchange key.

6. The system of claim 5, where the exchange circuitry is configured to obtain the exchange key by:
sending a communication to the leading exchange party in response to request;
accessing the exchange key based on a reference within the request;
receiving a message including the exchange key, the message sent on behalf of the leading exchange party, the message separate from the request; or
any combination of the foregoing.

7. A method including:
obtaining, via a network interface circuitry, a peer challenge from a reciprocal exchange party, wherein
the peer challenge configured to identify an exchange execution platform for a cryptologically-locked asset transaction, the cryptologically-locked asset transaction configured to, when released, transfer an asset to a leading exchange party from the reciprocal exchange party;
the peer challenge configured to release the cryptologically-locked asset transaction, after:
an exchange key is provided on behalf of the leading exchange party, and
the cryptologically-locked asset transaction is signed;
obtaining, via the network interface circuitry, the cryptologically-locked asset transaction from the reciprocal exchange party; and
obtaining via the network interface circuitry, a request from the leading exchange party to release the cryptologically-locked asset transaction, the request addressed to the exchange execution platform; and
at exchange circuitry in data communication with the network interface circuitry and operating on behalf of the exchange execution platform:
obtaining the request from the network interface circuitry; and
executing the release of the cryptologically-locked asset transaction by:
obtaining, via the network interface circuitry, the exchange key from the leading exchange party based on the request;
verifying the exchange key against the peer challenge; and
after verification of the exchange key, releasing the cryptologically-locked asset transaction by symmetrically coordination both:

signing the cryptologically-locked asset transaction; and releasing the exchange key to the reciprocal exchange party.

8. The method of claim 7, where:

the request includes the exchange key; and where obtaining the exchange key includes extracting the exchange key from the request.

9. The method of claim 7, where the request is signed using a private key associated with an identity controlled by the leading exchange party.

10. The method of claim 7, where the network interface circuitry is configured to obtain the request from a leading node associated with the leading exchange party.

11. An exchange execution platform product including:

a network interface circuitry;

an exchange circuitry in data communication with the network interface circuitry and including a processor and a non-transitory machine-readable media storing instructions configured, when executed by the processor, to cause the exchange execution platform product to:

obtain, via the network interface circuitry, a peer challenge form a reciprocal exchange party, wherein the peer challenge is configured to identify the exchange execution platform product a cryptologically-locked asset transaction, the cryptologically-locked asset transaction configured, when released, to transfer an asset to a leading exchange party from the reciprocal exchange party;

the peer challenge is configured to release the cryptologically-locked asset transaction, after:

an exchange key is provided on behalf of the leading exchange party, and the cryptologically-locked asset transaction is signed;

obtain, via the network interface circuitry, the cryptologically-locked asset transaction from the reciprocal exchange party; and obtain, via the network interface circuitry, a request from the leading exchange party to release the cryptologically-locked asset transaction, wherein the request is addressed to the exchange execution platform product and includes the exchange key; and execute, using the exchange circuitry, the release of the cryptologically-locked asset transaction by:

extracting the exchange key from the request;

verifying the exchange key against the peer challenge; and after verification of the exchange key, releasing the cryptologically-locked asset transaction by symmetrically coordination both:

signing the cryptologically-locked asset transaction; and releasing the exchange key to the reciprocal exchange party.

12. The exchange execution platform product of claim 11, wherein a timeout window is established for the cryptologically-locked asset transaction, and upon expiry of the timeout window, the cryptologically-locked asset transaction is configured to return an asset to a sender instead of releasing to be transferred to the leading exchange party.

\* \* \* \* \*

UNITED STATES PATENT AND TRADEMARK OFFICE
CERTIFICATE OF CORRECTION

PATENT NO. : 11,551,204 B2
APPLICATION NO. : 16/668419
DATED : January 10, 2023
INVENTOR(S) : Olekss et al.

Page 1 of 1

It is certified that error appears in the above-identified patent and that said Letters Patent is hereby corrected as shown below:

In the Claims

In Column 15, Claim 1, Line 65, delete "horn"

In Column 16, Claim 7, Line 67, delete "coordination" and replace with --coordinating--

In Column 17, Claim 11, Line 24, delete "form" and replace with --from--

In Column 17, Claim 11, Line 26, insert --for-- between "product" and "a"

In Column 18, Claim 11, Line 20, delete "coordination" and replace with --coordinating--

Signed and Sealed this
Twenty-fifth Day of April, 2023

Katherine Kelly Vidal
*Director of the United States Patent and Trademark Office*